June 1, 1943.  R. BINDER  2,320,697
SHOCK ABSORBER WITH SPRING-PLATE VALVE
Filed Oct. 8, 1940  2 Sheets-Sheet 1
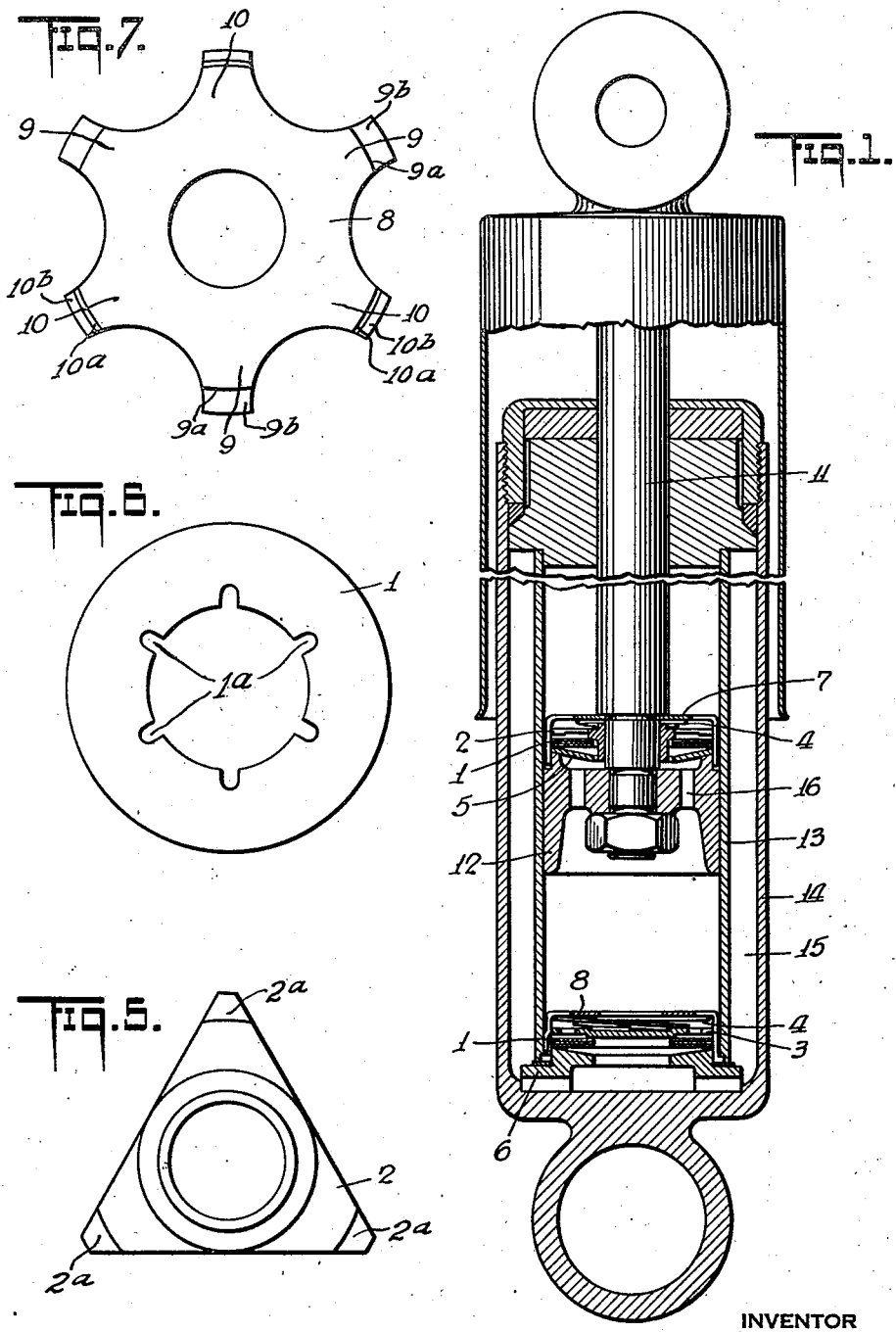
INVENTOR
*Richard Binder*
BY
ATTORNEYS June 1, 1943. R. BINDER 2,320,697
SHOCK ABSORBER WITH SPRING-PLATE VALVE
Filed Oct. 8, 1940 2 Sheets-Sheet 2
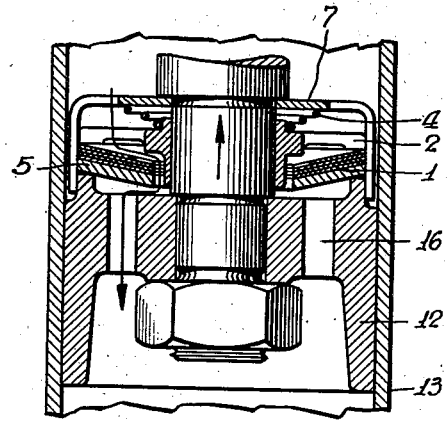
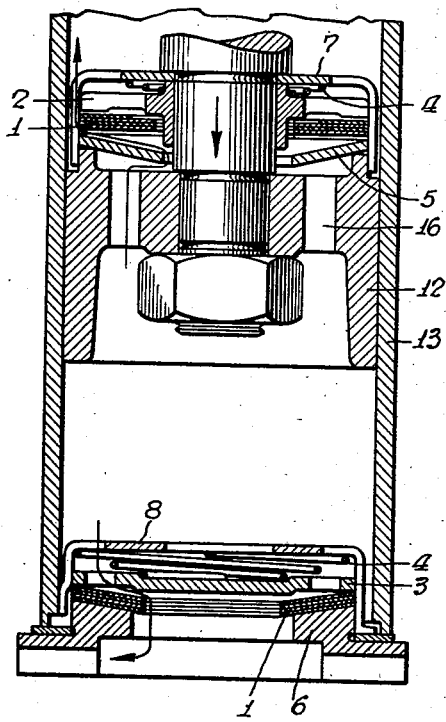
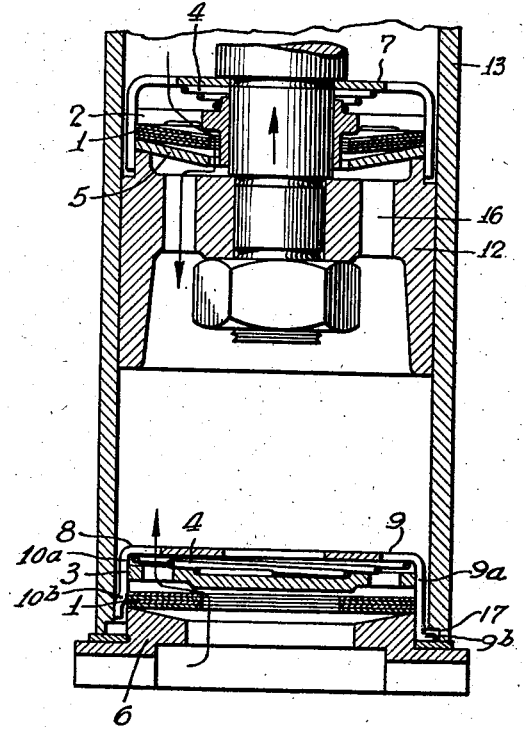
INVENTOR
Richard Binder
BY
ATTORNEYS Patented June 1, 1943

2,320,697

UNITED STATES PATENT OFFICE 2,320,697

SHOCK ABSORBER WITH SPRING-PLATE VALVE

Richard Binder, Schweinfurt, Germany; vested in the Alien Property Custodian

Application October 8, 1940, Serial No. 360,274
In Germany October 24, 1939

11 Claims. (Cl. 188—88)

The invention relates to spring-plate valves especially for use in telescopic shock absorbers.

Valves of this kind operating in the one direction of liquid flow as throttle valves and in the opposite direction as check valves and provided with a number of spring or resilient disc or plate members have, when used in hydraulic shock absorbers of the telescopic type, the drawback of producing considerable noises due to the substantial large liquid displacement with every stroke.

The object of the invention is to remove as far as possible the noise formation in connection with telescope-shock absorbers by a special construction of the valves located at the piston and, in case of double acting shock absorbers, located at the piston and at the bottom of the cylinder respectively. Simultaneously the novel valve construction allows an extremely fine accommodation to the action of the shock absorber by simple and cheap means.

In accordance with the invention the object aimed at is attained substantially by the fact that the disc valve preferably consists of a plurality of annular resilient discs arranged one upon another which in the direction turned away from the annular support cooperate with a valve body movably arranged against the action of a spring and allowing liquid to pass over.

Other features of the invention will appear in the following specification explaining the invention by way of example in connection with one modification.

In the accompanying drawings one constructional embodiment of the invention is shown by way of example in connection with a double acting telescope-shock absorber having two valves and a piston rod operating as displacing means.

In these drawings which form a part of this specification,

Fig. 1 shows a broken away longitudinal section of a hydraulic shock absorber provided with a disc valve at the piston and a disc valve at the bottom of the cylinder which latter valve allows liquid to flow from the cylinder to the equalizing chamber concentrically arranged to the cylinder and, vice versa, Fig. 2 is a sectional elevation on a larger scale through a part of the shock absorber with piston and valves during the outward stroke of the piston, Fig. 3 shows a view similar to that of Fig. 2 with the piston during its outward stroke with fully opened disc valve, Fig. 4 is a broken away section corresponding to Fig. 2 and shows the position of the valves during the inward stroke of the piston, Fig. 5 is a plan view of one construction of a valve body of the piston, Fig. 6 is a plan view of a resilient disc with recesses at the inner circumference for allowing liquid to pass, and Fig. 7 is a plan view of a cage for the resilient discs and the valve body as well as the spring for the disc valve located at the end of cylinder.

In the shock absorber shown in the drawings, a disc valve according to the invention is arranged at the upper end of the piston 12 and another disc valve is located at the lower end of the cylinder 13 to render the shock absorber active in both directions. For a single acting shock absorber one valve is sufficient.

By moving the members of a shock absorber away from each other, the valve provided at the piston acts as a throttle valve and when moving such members towards each other the valve located at the end of the cylinder comes to action. When performing the stroke in this direction it is not the piston itself which displaces the liquid, but the piston rod acting as plunger. In principle, the valves provided at the piston and at the bottom of the cylinder are constructed in the same manner. Slight differences in the construction are due to the fact only that in the one case it is the piston rod or a pin-like extension of the latter respectively, carrying the piston, which must extend through the valve, whereas in the other case, i. e. with the valve located at the bottom of the cylinder, a valve body closed in its middle portion is provided, having for instance bores at the edge.

The disc valve according to the invention preferably consists of a plurality of thin annular resilient discs I arranged one above the other and cooperating with an axially movable valve body 2 or 3 respectively. In inoperative position shown in Fig. 1, the valve bodies 2 and 3 are pressed against respective sets of resilient discs I by means of respective weak springs 4. These sets of resilient discs I in turn are pressed by these spring-pressed valve bodies 2 and 3 against the outer edges of slightly tapered or vaulted annular disc seating plates 5 and 6 respectively provided with conical surfaces to limit extent of flexing of the discs I as will be made apparent. The plate 6 forms the bottom of the cylinder 10. The resilient discs I, the valve body 2 or 3 respectively and the spring 4 are enclosed and held together by a suitable cage 7 or 8 respectively the edge parts of which are bent to form a cylindrical periphery. As shown in Fig. 7 said cage is provided with marginal recesses or bores to allow liquid to pass. To facilitate assembling of the shock absorber the cage 8 for the valve located at the cylinder bottom is, as shown in Fig. 7, preferably constructed with a series of alternately arranged radiating arms 9 and 10 forming therebetween spaces through which the liquid passes from the cylinder 13 to the compensation chamber 15 formed between the cylinder 13 and the casing 14, and vice versa. Arms 9 are offset to form flanges or legs 9a terminating at their radially outer ends in respective feet 9b, which extend into a groove 17 formed near the bottom of the cylinder 13, so that said cage is locked in position with respect to said cylinder. The alternate arms 10 have respective flanges 10a with their outer ends 10b offset outwardly to resiliently and frictionally engage the inner periphery of the cylinder 13, so that the cage 8 is properly centered with respect to said cylinder.

The cage 7 need not be provided with resilient feet at the marginal portion, because its middle opening encircles the reduced tapered portion of the piston rod 11 and said cage is pressed by one end of the spring 4 against the collar of the piston rod so that in this manner the cage is held in position. The other end of the spring 4 bears against the valve body 2 the outer edge of which bears against the resilient discs 1 during certain operations of the shock absorber as will be explained, and thereby presses the support 5 so that the outer edge of said support bears against an annular projection on the piston provided with passages 16 for the liquid. In a similar manner the spring 4 of the valve located at the bottom of the cylinder presses the discs 1 and the valve body 3 against the elevated outer edge of the body 6.

The valve body 2 of the piston valve may have various forms. For instance, it may be of triangular form as shown in Fig. 5 to allow passage of liquid across its straight sides, or it may be circular with holes near its periphery, such as is the construction of the valve body 3 shown in Figs. 2 to 4. As shown in Figs. 2 to 4 the valve body 2 is provided with an interior collar surrounding the piston rod which collar first bears against the resilient discs 1 and effects closing of the valve. For this purpose the collar is somewhat thicker in axial direction than the flangelike projections 2a at the apices of the body 2 so that these projections bears against the outer edge of the resilient discs 1 only during certain strokes as will be made apparent.

The valve body 3 consists of a disc having a closed preferably dish-shaped middle portion and provided at its edge with passages or bores to allow the flow of liquid.

At least several of the resilient discs 1 in the cage 7, for instance the upper discs 1 facing the valve body 2, are provided at the inner circumference with recesses 1a, as shown in Fig. 6, for allowing the flow of liquid.

The flow of liquid through the valves is indicated by arrows in Figs. 2 to 4 if the piston moves in the direction also indicated by arrows. As may be seen from these figures the liquid passes in both directions through the valve located at the bottom of the cylinder along the inner circumference of the resilient discs 1, whereas at the piston valve during the outward stroke of the piston the liquid flows along the interior circumference and through recesses provided at this circumference of the discs 1 respectively, whereas during the inward stroke in opposite direction the liquid flows along the interior circumference of the supporting plate 5 through the gap between the plate 5 and the extension of the piston rod 11 and along the outer circumference of the resilient discs 1.

The operation of the valve according to the invention is as follows:

In the operation of the device, when the shock absorber is in inoperative position shown in Fig. 1, the two sets of discs 1 in the two cages 7 and 8 respectively are substantially flat. In the upper cage 7 the collar on the valve body 2 is pressed against the inner periphery of the discs 1 by the spring 4, while the projections 2a at the outer edges of said valve body are spaced away from said discs. In the bottom cage 8 the central depressed portion of the valve body 3 bears against the inner periphery of the discs 1 by the action of the spring 4, while the outer edge is spaced from said latter discs.

When the two parts of the shock absorber are moved away from each other in the direction indicated in Fig. 2, the valve body 2 and the resilient discs 1 in the cage 7 are somewhat pressed together at the beginning of the upward stroke of the piston by the pressure of the liquid above said piston. This initial pressing action causes a flexing of the discs 1 into dished position until the projections 2a on the outer edges of the valve body 2 bear against the outer edge of the set of resilient discs 1 as shown in Fig. 2. The flexing of the discs 1 causes the movement of the inner periphery of said discs away from the shoulder of the collar on the valve body 2, so that a flow of liquid is effected across the straight sides of the valve body 2, through the recesses 1a on the inner peripheries of the discs 1, through the central opening of the disc supporting plate 5, and through the passages 16 of the piston 12 in the direction indicated. At the same time, suction is created in the chamber of the cylinder 13 above the bottom valve, so that the valve body 3 is lifted above the associated discs 1 against the action of the corresponding spring 4, and the liquid permitted to flow from the compensating chamber 15, through the space between the discs 1 and the valve body 3 and through the openings in said valve body in the direction indicated.

As the pressure of the liquid increases during the upward movement of the piston 12, resilient discs 1 in the cage 7 are further flexed until they bear against the concave surface of the supporting plate 5 as shown in Fig. 3. This action increases the area of the passages through which the liquid flows between the chambers on the opposite sides of the piston 12, so that greater flow of liquid through said passages is effected as shown.

On the return movement of the two parts of the shock absorber, i. e. on moving the members of the shock absorber towards each other, the valve body 2 and the resilient discs 1 in the cage 7 are lifted by the liquid pressure, so that the liquid may flow from the lower chamber into the upper chamber of the cylinder without any appreciable resistance being offered as shown in Fig. 4. In this direction of the stroke, the stress of the spring 4 in the cage 7 is overcome to permit the lifting of the valve member 2 and the discs 1, and to thereby afford a passage for the upwardly moving liquid past the inner edge of the support plate 5 and the outer edges of the discs 1 and valve body 2. At the same time, the pressure of the liquid in the chamber above the bottom valve flexes the discs 1 in said valve, so that they bear against the surface of the supporting member 6, and the valve member 3 moves into peripheral engagement with the periphery of said discs. This action forms a passage between the valve member 3 and the inner periphery of the resilient discs 1, so that the liquid flows through the bottom valve in the direction indicated through the bores of the valve member 3, through the space between the bottom of said valve member and the flexed discs 1, and through the central openings of said discs.

It should be noted that a noiseless operation of the valves is effected due to the fact that any change in the direction of movement of the piston 12 is attended with no clattering of the parts of the valves, since the changes in the valves between open and closed positions are uniform and according to the liquid pressure prevailing at the time, and since the extent of opening during certain strokes is varied by a flexing of the discs 1, while said discs are peripherally clamped between the valve members 2 and 3 and their respective supporting members 5 and 6.

The details of construction of the valve may differ from the modification shown and described by way of example without departing from the spirit of the invention. So for instance, in certain cases it may be sufficient to use a single resilient disc in connection with the movable valve body instead of employing the plurality of resilient discs shown in the drawings.

What I claim is:

1. A disc valve particularly adapted for hydraulic shock absorbers, and operating alternately as a throttle valve and a check valve, comprising a seat member, a valve body, said seat member and said valve body defining a valve passage, and a resilient disc disposed between said seat member and said valve body and having its outer periphery seated on said seat member for controlling the flow through said passage, said valve body being movable by the pressure of liquid acting on said valve body axially towards said seat member and in position to clamp the periphery of said disc between said seat member and said valve body, said seat member having a concave conical surface radially inwardly of its disc seating section, and said disc having a central opening to permit said disc to flex from valve check position axially into limiting contact with said conical surface and in position to permit flow through said opening and through said passage, said passage permitting flow of said liquid against said disc to exert flexing pressure on said disc.

2. A disc valve particularly adapted for hydraulic shock absorbers, and operating alternately as a throttle valve and a check valve, comprising a seat member, a valve body, spring means urging said valve body axially towards said seat member, said seat member and said valve body defining a valve passage, and a batch of resilient discs disposed between said seat member and said valve body and having its outer periphery seated on said seat member for controlling flow through said passage, said seat member having a concave conical surface radially inwardly of its disc seating section, and said discs having a central opening to permit said disc to flex from valve check position axially into limiting contact with said conical surface in position to permit flow through said opening and through said passage when said disc is subjected to liquid pressure.

3. A disc valve particularly adapted for hydraulic shock absorbers, and operating alternately as a throttle valve and a check valve, comprising a seat member, a valve body, said seat member and said valve body defining a valve passage, and a resilient disc having a central opening and disposed between said seat member and said valve body, said disc having its outer periphery seated on said seat member for checking flow through said passage, and its inner periphery engaged by said valve body to block flow through said opening, said seat member having a depression radially inwardly of its disc seating section to permit said disc to flex from valve check position axially into said depression and away from inner peripheral engagement with said valve body in position to permit flow through said opening and through said passage when said disc is subjected to liquid pressure, said disc having a series of recesses at its inner periphery permitting liquid to flow therethrough between said disc and said valve body in flexed position of said disc.

4. A disc valve particularly adapted for hydraulic shock absorbers, and operating alternately as a throttle valve and a check valve, comprising a seat member, a valve body of triangular shape, said seat member and said valve body defining a valve passage, a portion of which extends across the straight sides of said valve body, and a resilient disc disposed between said seat member and said valve body, and having its outer periphery seated on said seat member for controlling the flow through said passage, said seat member having a depression radially inwardly of said disc seating section, and said disc having a central opening to permit said disc to flex from valve check position axially into said depression in position to permit flow through said opening and through said passage when said disc is subjected to fluid pressure.

5. A disc valve particularly adapted for hydraulic shock absorbers, and operating alternately as a throttle valve and a check valve, comprising a seat member, a circular valve body having a series of circularly arranged holes, said seat member and said valve body defining a valve passage communicating with said holes, and a resilient disc disposed between said seat member and said valve body, and having its outer periphery seated on said seat member for controlling the flow through said passage, said seat member having a concave conical surface radially inwardly of its disc seating section, and said disc having a central opening to permit said disc to flex from valve check position axially into limiting contact with said conical surface in position to permit flow through said opening and through said passage when said disc is subjected to fluid pressure.

6. A disc valve particularly adapted for hydraulic shock absorbers, and operating alternately as a throttle valve and a check valve, comprising a seat member, a valve body, said seat member and said valve body defining a valve passage, and a resilient disc disposed between said seat member and said valve body, and having its outer periphery seated on said seat member for controlling the flow through said passaage, said disc having a central opening, and said valve body having a central portion engaging the periphery of said opening to prevent flow of liquid between the inner edge of said disc and said valve body, said valve body in latter position having its outer edge out of engagement with the periphery of said disc, said valve body being axially movable in position to clamp the periphery of said disc between said seat member and the outer edge of said valve body, said seat member having a depression radially inwardly of its disc seating section to permit said disc to flex axially into said depression with its inner periphery spaced from the central portion of said valve body, to permit flow between said disc and said central portion along the inner edge of said disc.

7. A disc valve particularly adapted for hydraulic shock absorbers, and operating alternately as a throttle valve and a check valve, comprising a seat member, a valve body having a central unperforate dished portion forming a projection on one side of said valve body, said seat member and said valve body defining a valve passage, and a resilient disc disposed between said seat member and said valve body, and having its outer periphery seated on said seat member for controlling the flow through said passage, said disc having a central opening, and said valve body having its central projection engaging the periphery of said opening to prevent flow of liquid between the inner edge of said disc and said valve body, said valve body in latter position having its outer edge out of engagement with the periphery of said disc, said valve body being axially movable in position to clamp the periphery of said disc between said seat member and said valve body, said seat member having a depression radially inwardly of this disc seating section to permit said disc to flex axially into said depression with its inner periphery spaced from the central projection of said valve body, to permit flow between said disc and said projection along the inner edge of said disc.

8. In a hydraulic shock absorber, the combination comprising a cylinder, a piston slidable in said cylinder, and having a passage for the flow of liquid therethrough, a valve seat member on said piston having a depression on the radially inner side of the seating section of said seat member, a valve body, spring means urging said valve body axially towards said seat member, said seat member and said valve body defining a valve passage communicating with said piston passage, and a resilient disc with a central opening disposed between said seat member and said valve body, and having its outer periphery seated on said seat member, said disc flexing towards said depression during one stroke of the piston for establishing liquid flow in one direction along the inner edge of said disc, and returning to unflexed position and raising off the seating section of said seat member during return stroke of said piston for establishing liquid flow in the opposite direction along the outer edge of said disc.

9. In a hydraulic shock absorber, the combination comprising a cylinder, a piston slidable in said cylinder, and having a passage for the flow of liquid therethrough, a valve seat plate on said piston having a conical concave surface and a central opening, a valve body on the conical side of said plate, spring means urging said valve body axially towards said plate, said seat plate and said valve body defining a valve passage communicating with said piston passage, and a resilient disc disposed between said seat member and said valve body, and having its outer periphery seated on said seat member to control flow through said passages, said disc having a central opening and being free to flex axially into contact with the conical surface of said seat plate, whereby the extent of flexing of said disc is limited by said seat plate, said disc flexing during one stroke of the piston to establish liquid flow in one direction along the inner edge of said disc and of said seat plate, and returning to unflexed position during return stroke of said piston to establish liquid flow in the opposite direction along the inner edge of said seat plate and the outer edge of said disc.

10. In a hydraulic shock absorber, the combination comprising a cylinder, and a valve at one end of said cylinder having a seat member, a valve body, spring means urging said valve body axially towards said seat member, said seat member and said valve body defining a valve passage, a resilient disc disposed between said seat member and said valve body, and having its outer periphery seated on said seat member for controlling flow through said passage, and a cage holding said seat member, valve body, spring means and disc together as a unit, and provided with one or more passages communicating with said valve passage and permitting flow of liquid therethrough, said cage having a series of legs terminating in outward feet extending into an annular recess at the bottom of said cylinder, said seat member having a depression radially inwardly of its disc seating section, and said disc having a central opening, to permit said disc to flex from valve check position axially into said depression in position to permit flow through said opening and through said passage when said disc is subjected to liquid pressure.

11. A disc valve particularly adapted for hydraulic shock absorbers, and operating alternately as a throttle valve and a check valve, comprising a seat member having a valve passage and a depression radially inwardly of its seating section, a valve body with a valve passage, and a resilient disc separable from said valve body and disposed between said seat member and said valve body, said disc having its outer periphery seated on said seat member, and having a central opening for establishing communication between said passages, said passages being out of axial alignment with said opening, whereby said disc blocks flow of hydraulic liquid through said passages when the pressure on opposite sides of said valve is equalized, said disc being flexed axially into said depression and away from said valve body when said valve is subjected to hydraulic pressure on one side thereof to permit flow through said opening and through said passages in one direction, said disc being restored into unflexed position and said valve body raised from said disc when said side of said valve is subjected to suction to permit flow through said opening and said passages in the opposite direction.

RICHARD BINDER.